United States Patent [19]

Jablin

[11] 4,085,849

[45] Apr. 25, 1978

[54] MACHINERY LOCATING DEVICE

[76] Inventor: Richard Jablin, P.O. Box 514, Winchester, Va. 22601

[21] Appl. No.: 656,895

[22] Filed: Feb. 10, 1976

[51] Int. Cl.[2] .......... B65G 65/50

[52] U.S. Cl. .......... 214/1 BB; 214/1 R; 214/16.4 A

[58] Field of Search .......... 214/1 R, 1 BB, 620, 214/16.4 A; 104/48, 49

[56] References Cited

U.S. PATENT DOCUMENTS

| | | | |
|---|---|---|---|
| 2,959,445 | 11/1960 | Breslav | 294/86 R |
| 3,206,041 | 9/1965 | McGrath | 214/650 SG |
| 3,420,389 | 1/1969 | Gustetic | 214/16.4 A |
| 3,549,025 | 12/1970 | Messner | 214/620 X |
| 3,606,039 | 9/1971 | Weston | 214/16.4 A |
| 3,738,506 | 6/1973 | Cornford | 214/16.4 A X |
| 3,870,164 | 3/1975 | Haase | 214/1 BC |
| 4,007,843 | 2/1977 | Lubbers | 214/16.4 B |

FOREIGN PATENT DOCUMENTS

| | | | |
|---|---|---|---|
| 698,686 | 11/1964 | Canada | 294/DIG. 2 |
| 1,351,445 | 5/1974 | United Kingdom | 214/16 B |

*Primary Examiner*—Drayton E. Hoffman
*Assistant Examiner*—George F. Abraham
*Attorney, Agent, or Firm*—Finnegan, Henderson, Farabow & Garrett

[57] ABSTRACT

A machinery locating device comprising power-activated clamps which are restrained within a housing and which engage with one or more adjustably positioned stops. The clamps are secured to a moving piece of machinery such as a crane and the stops are secured to a fixed structure. When the clamps are open, the machinery can move freely past the stops. When the clamps are closed on the stops, the machinery is accurately positioned with respect to the structure. Interlocking is provided to insure that the machinery drive is disconnected before the clamps may be applied to the stops, and to insure that the clamps are opened before the machinery drive may be engaged.

The locating device is especially suited to the accurate, repetitive positioning of massive moving machines such as travelling cranes, charging machines for the coke ovens and so forth.

3 Claims, 7 Drawing Figures

MACHINERY LOCATING DEVICE

DISCLOSURE OF INVENTION

The present invention relates to a locating device for accurately positioning moving machinery. Typical of such moving machinery are travelling cranes, locomotives, charging machines for coke ovens, pushing machines for coke ovens and the like.

In some applications, it is desirable to accurately position traveling machines, such as those enumerated above. The machines are massive and require large forces for acceleration and deceleration during the operation of positioning. Such large forces are difficult to control accurately, in consequence of which, it is difficult to position the machinery accurately to a desired fixed location. In a situation wherein the accurate positioning must be repeated at more or less frequent intervals, there is opportunity for error on the part of the operator. The error results in inaccurate positioning of the machinery, loss of time in operation, and, depending on the nature of the operation, potential damage.

A purpose of this invention is to provide a locating device for traveling machinery which positions the machinery to a pre-set location in a repetitively accurate manner.

A further purpose of the invention is to provide a locating device comprising power-activated clamps which are restrained into a pre-established location on the traveling machinery.

A further purpose of the invention is to provide one or more stops which are secured to a fixed structure and which are adjustable such that the clamping action positions the machinery at one or more pre-set locations.

A further purpose of the invention is to provide safety interlocking between the normal drive for the traveling machinery and the locating device, such that the drive may not be operated when the clamps are engaged and the clamps may not be operated when the drive is engaged.

In the drawings, I have chosen to illustrate three of the numerous embodiments in which the invention may appear, selecting the forms shown from the standpoints of convenience in illustration, satisfactory operation and clear demonstration of the principles involved.

Figure 1:
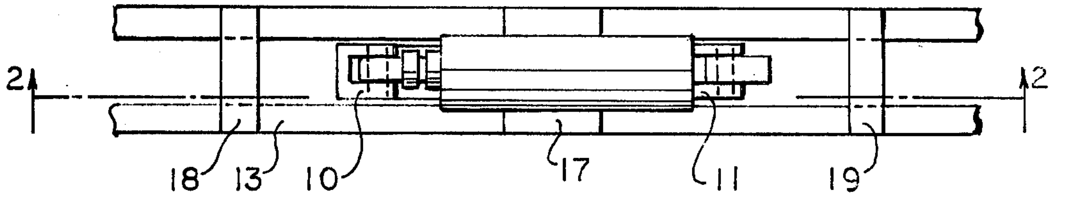
FIG. 1 is a plan view of a locating device which is operated by a power cylinder.

In prior art, massive machinery such as traveling cranes and the like are powered by motors which connect to driving wheels through gearing. The gearing is, most usually, reduction gearing. A brake is usually connected to the motor shaft. In order to move the machinery, power is applied to the motor; to stop it, power is removed from the motor and is applied to the brake. Assistance in braking may be provided by dynamic braking on the motor. In either case, the desired position of the machinery is observed by the eye of the operator who makes such adjustments in position as he deems necessary, or by a sensing device such as a photoelectric eye, a magnetic sensor and the like.

The accuracy of final position for the machinery depends on several factors, each of which may contribute a degree of error. The final sensing device, whether the operator's eye or a sensor, has a built-in error of observation between the desired final position and the observed final position, or approach to final position, depends on the interval of time between the sensing of the position and the applying of the brake. During a varying time interval, the machinery moves a varying distance, adding to the error. Finally, the braking operation varies in distance depending upon the initial speed of travel of the machinery, the condition of the brake shoes, the ambient conditions and so forth.

The factors of sensing error, variable time constant and variable braking action all combine to create a total error between the desired final position of the machinery and the actual position. Repositioning may lessen the error, but may not remove it entirely. In a frequently repeated operation, the operator may become bored or careless and not resort to repositioning even when it is obviously needed. The result is more or less serious deviation between desired and actual position.

In certain applications of traveling machinery, the machinery must be stopped accurately at one or more pre-determined locations and within a short period of time. One such application is the pushing machine which serves a battery of coke ovens. In this application the machine, when stopped, must be accurately aligned with the oven. If alignment is not accurate, damage results to the door of the oven when the former is removed or replaced. The damage causes expense for maintenance and also permits leakage of gas from the oven to the atmosphere, resulting in air pollution. Other similar applications are the door machine on the coke side of the battery and the coal charging machine on the top of the battery. Still other applications are the traveling cranes which serve forging operations, and so forth.

I have discovered that it is possible to mount a locating device on the traveling machine which can engage with one or more fixed stops and thereby accurately position the traveling machine. Operation of the locating device is independent of sensing errors, errors in time constants, and errors in braking operation. The result is, in a repetitive operation, that the traveling machine is halted at exactly the same position each time it is stopped at a given location.

In accordance with the invention, the locating device consists of power-actuated clamps mounted in a housing which is secured to the traveling machine. One or more stops are secured to a fixed structure, each corresponding to a position at which it is desired to halt and accurately locate the traveling machine. In operating the locating device, the traveling machine is moved by the normal drive to approximately the desired position and halted. The normal drive is then disengaged and the clamps are applied, bringing the traveling machine into exact position. When it is desired to once again move the traveling machine, the clamps are released and the normal drive engaged.

When the clamps of the locating device are opened, they are also retracted so that the traveling machine may safely pass the stops without collision between the clamps and the stops. In order to avoid such collisions, safety interlocking is provided between the normal drive and the clamping operations so that one may not function when the other is engaged and operating.

Figure 2:
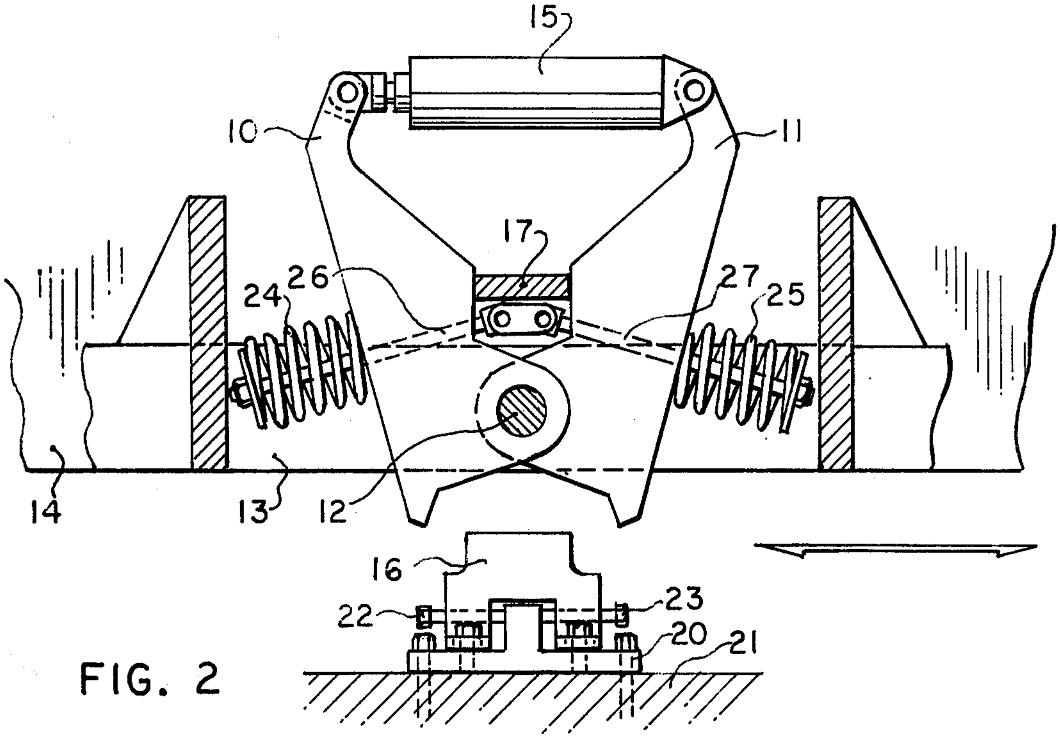
FIG. 2 is a sectional view on line 2—2 of FIG. 1, the clamps being shown in the open position.
Figure 3:
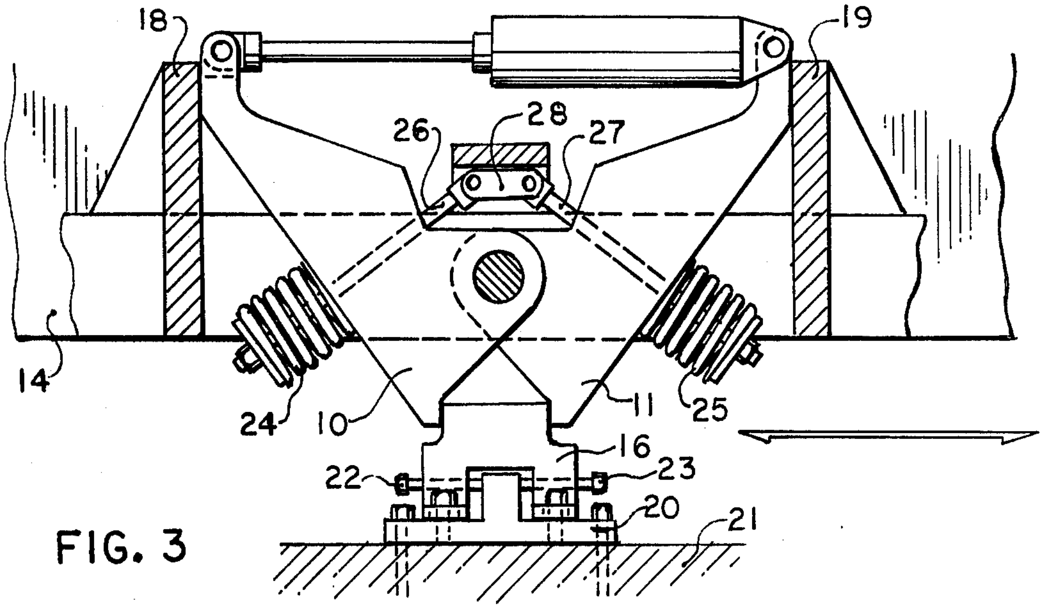
FIG. 3 is a sectional view on line 2—2 of FIG. 1, the clamps being shown in the closed position.

First considering FIGS. 1, 2 and 3, the locating device comprises a pair of clamps 10 and 11 which are pivoted about pin 12. Pin 12 is secured in housing 13 which is mounted on the traveling machinery 14. A power-operated cylinder 15 opens or closes the clamps, as desired.

In FIG. 2, the clamps 10 and 11 are shown in the open position. The lower ends of the clamps may freely pass the stop 16 when the traveling machinery moves in the direction of the double-headed arrow. The position of the clamps in the housing 13 is determined by the middle block 17 which is fastened to the housing.

In FIG. 3, the clamps 10 and 11 are shown in the closed position. The lower ends of the clamps press tightly upon the stop 16. The position of the clamps in the housing 13 is determined by the end blocks 18 and 19 which are fastened to the housing. The combination of upper and lower restraints on the clamps effectively positions the traveling machinery with respect to the stop 16.

The stop 16 is mounted on a sole plate 20, which is bolted to a fixed structure 21. Adjusting screws 22 and 23 provide fine adjustment of the position of the stop with respect to the sole plate and thus to the fixed structure. A stop is provided at each stopping location for the traveling machinery as desired.

Springs 24 and 25, acting through rods 26 and 27 and linkage 28, act in such a manner as to open the clamps 10 and 11 when power is removed from the cylinder 18, either by intention or by accident. This provides one feature of safety against collision between the stops and the clamps should the power fail and the traveling machinery 14 be moving. Safety interlocking is also provided in the control circuits to prevent the operation of the normal drive of the traveling machinery when the clamps are in the closed position and to prevent the closing of the clamps when the normal drive is operating.

Operation of the locating device is as follows. The traveling machinery is moved to approximately the desired position by its normal drive. The normal drive is then disengaged and the clamps are applied, bringing the traveling machinery to an exact position. When it is desired to once again move the traveling machinery, the clamps are opened and then the normal drive is engaged.

Figures 4, 5:
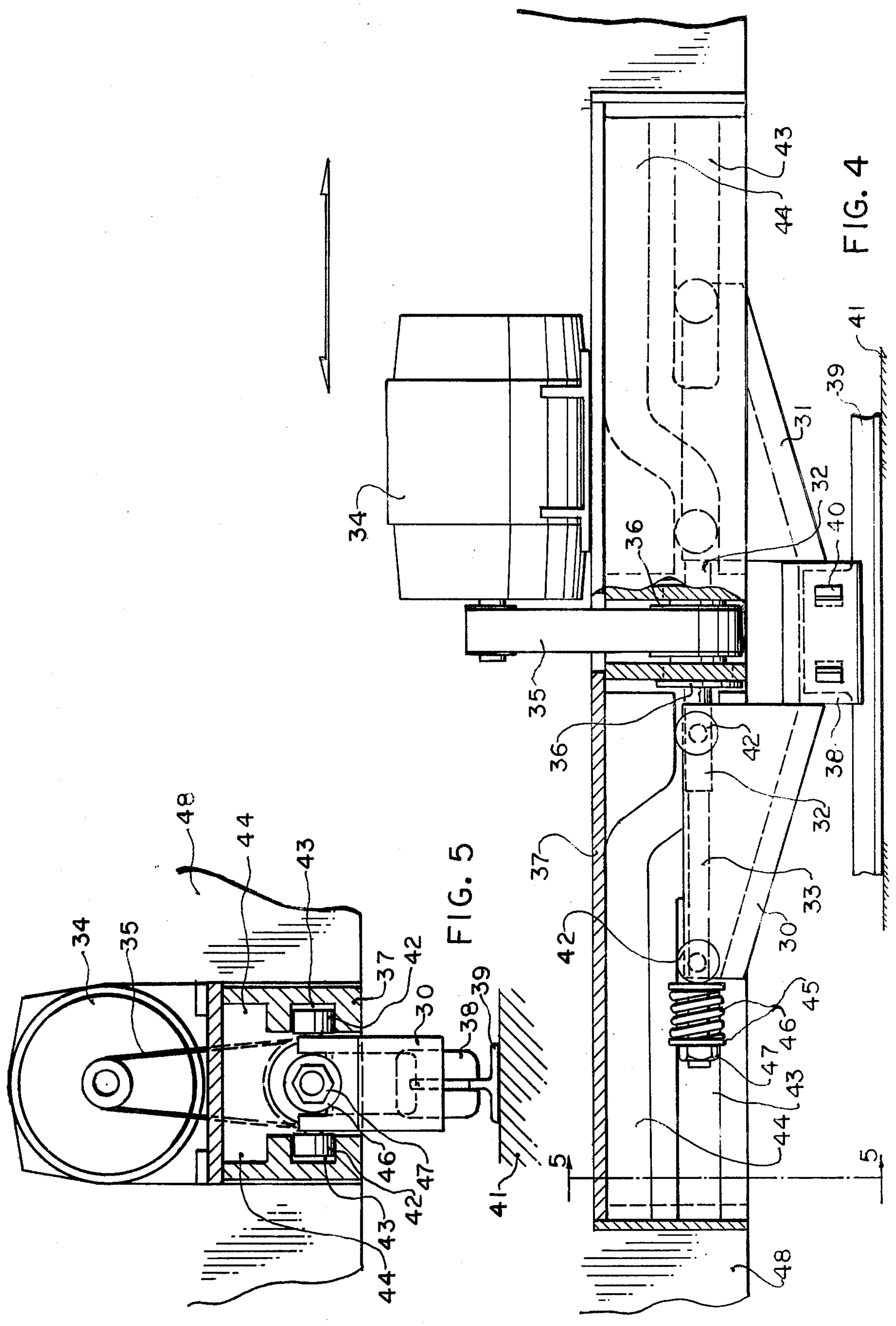
FIG. 4 is a elevation view in partial section of a locating device which is operated by a motor-driven screw.
FIG. 5 is a sectional view on line 5—5 of FIG. 4.

In FIGS. 4 and 5, the locating device comprises a pair of clamps 30 and 31 which are moved by means of nuts 32 acting on screws 33. The nuts are rotated by the motor 34 acting through belt drive 35. Bearings 36 in housing 37 permit rotation of the nuts while restraining them axially.

In FIG. 4, the clamps 30 and 31 are pressed against stop 38 which is secured to the sole frame 39 by means of wedges 40. The sole frame, in turn is fastened to a fixed structure 41. The wedges provide fine adjustment for the position of the stop with respect to the fixed structure.

Cam rollers 42 are mounted onto clamps 30 and 31. Cam tracks 43 and 44 are integral with the housing 37. The outboard cam rollers ride in cam tracks 43 which are straight. The inboard cam rollers ride in cam tracks 44 which are curved. The geometry of the tracks is such that, when the clamps are opened, they are retracted within the housing and are clear of any possible collision with the stops.

Spring 45 is placed between washer 46 and clamp 30, washer 46 being held by nut 47 on the end of the screw 33. When the clamps are open, there is little or no compression of the spring. When the clamps are closed, the spring is compressed, thereby causing the clamps to exert a resilient pressure on the stops. Spring 45 is shown on one clamp; however, springs may be applied to both clamps.

The locating device as shown in FIGS. 4 and 5 is mounted on the traveling machinery 48. The method of operation and the safety interlocking is as described for the locating device as shown in FIGS. 1, 2 and 3. The direction of motion of the machinery is indicated by the double-headed arrow.

Figure 6:
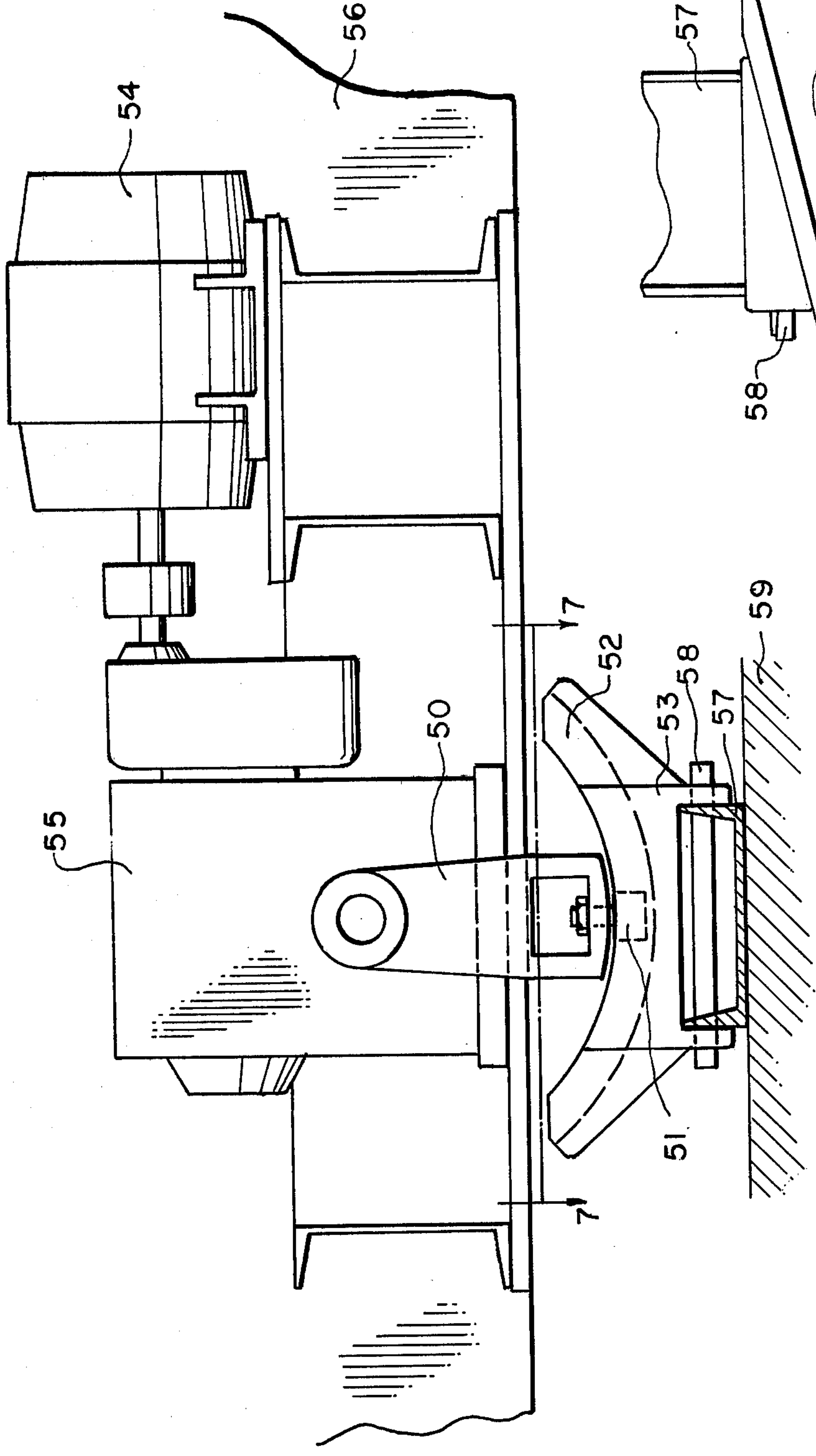
FIG. 6 is an elevation view of a locating device which is operated by a motor-driven rotating arm.
Figure 7:
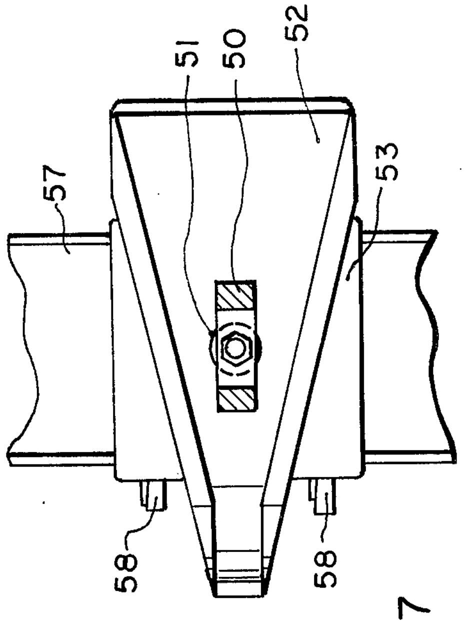
FIG. 7 is a sectional view on line 7—7 of FIG. 6.

In FIGS. 6 and 7 the locating device comprises a motor driven arm 50 which has a cam roller 51 mounted at its extremity. When the arm is rotated in the clockwise direction, the cam roller may enter and engage with the arc-shaped, tapered slot 52 of the stop 53. At the open end of the taper, the cam roller has a wide latitude of entry into the slot. As the arm rotates clockwise, as seen in FIG. 6, the slot narrows to a width which gives only running clearance for the cam roller, thereby positioning the cam roller and, in turn, the traveling machinery.

The arm 50 is driven by motor 54 through reduction gear 55. The complete assembly is mounted on traveling machinery 56. The stop 53 is secured to the sole frame 57 through adjusting wedges 58. The sole frame, in turn, is secured to fixed structure 59.

Operation of the locating device is as follows. The traveling machinery 56 is moved to approximately the desired position by its normal drive. During this movement, the arm 50 is at the 3 o'clock position when seen in FIG. 6. The normal drive is then disengaged and the arm is rotated in the clockwise direction approximately 130°, during which rotation the cam roller enters the narrow portion of the slot 52, effectively and accurately locating the traveling machinery 56. When it is desired once again to move the traveling machinery, the arm is rotated clockwise to the 3 o'clock position and the normal drive is engaged. Safety interlocking is provided in this arrangement as in the previous two arrangements. The double-headed arrow indicates the direction of motion of the traveling machinery.

The purpose of the invention may be served by various alternatives to those described and illustrated. For example, the clamp arrangement of FIG. 4 may be operated by means of the power cylinder of FIG. 1 instead of the screw and nut of FIG. 4. Additionally, the locating device may be applied to a wide variety of machinery, both massive and non-massive. In view of my invention and disclosure, variations and modifications to meet individual whim or particular need will doubtless become evident to others skilled in the art, to obtain all or part of the benefits of my invention without copying the apparatus shown and I therefore claim all such insofar as they fall within the reasonable spirit and scope of my claims.

Having thus described my invention, what I claim as new and desire to secure by Letters Patent is:

1. A locating device for accurately moving into and maintaining in position massive traveling machinery having a normal drive comprising:

(a) at least one stop secured to a fixed structure, said stop being accurately aligned to a desired position for locating said traveling machinery;

(b) a housing mounted on said traveling machinery;

(c) power-operated clamp means for contacting and gripping said stop, to independently of said normal drive, move into and maintain in said desired position said traveling machinery and for retracting from said stop to permit said traveling machinery to move past said stop without interference between said stop and said clamp means, said clamp means being contained in said housing and, when opened, retracting at least partially into said housing;

(d) a plurality of cam rollers mounted on said clamp means and cam track means, in which said cam rollers ride for causing said clamp means to retract when opened and to project from said housing when closed; and (e) power means independent of said normal drive, mounted on said traveling machinery for operating said clamp means.

2. The locating device of claim 1, wherein said clamp means comprises two clamps and wherein at least one clamp includes spring means for causing said clamps to press resiliently on said stop.

3. The locating device of claim 1, further comprising interlocking control circuit means for preventing operation of said clamp means when the normal drive for said traveling machinery is engaged and for preventing operation of said normal drive when said clamp means are closed on said stops.

* * * * *